United States Patent [19]
Rini et al.

[11] Patent Number: 5,131,835
[45] Date of Patent: Jul. 21, 1992

[54] METHOD FOR COOKING DOUGH PRODUCTS

[75] Inventors: Matthew J. Rini, Madison; Vincent Apicella, West Haven; Frederick Fulton, Guilford, all of Conn.; Bennet Black, Orchard Park, N.Y.; James Sinnott, Stratford, Conn.

[73] Assignee: Kraft General Foods, Inc., Northfield, Ill.

[21] Appl. No.: 633,669

[22] Filed: Dec. 26, 1990

[51] Int. Cl.$^5$ ............................................. A21D 6/00
[52] U.S. Cl. .................................. 426/509; 426/499; 426/523
[58] Field of Search ............... 426/509, 499, 505, 523, 426/549; 99/404, 406, 443 C

[56] References Cited

U.S. PATENT DOCUMENTS

| | | | |
|---|---|---|---|
| 3,966,983 | 6/1976 | Dexter et al. | 99/404 |
| 4,147,809 | 4/1979 | Thompson | 426/504 |
| 4,657,769 | 4/1987 | Petrofsky et al. | 426/499 |
| 4,759,939 | 7/1988 | Keller et al. | 426/499 |
| 4,882,984 | 11/1989 | Eves | 99/404 |

OTHER PUBLICATIONS

Promotional material from Garroutte of Watsonville, Calif. from two publications; Waterfall Hydro-Chiller and Garroutte Pure Steam Blanching.

*Primary Examiner*—George Yeung
*Attorney, Agent, or Firm*—Fitch, Even, Tabin & Flannery

[57] ABSTRACT

A shower cooker apparatus includes a lower vessel and an upper shower fan for a heated fluid cooking medium such as water. The bottom portion of the bagel or other dough product is bathed in the vessel, while the top portion is showered, for simultaneous cooking of the top and bottom portions. The dough products are carried on a conveyor which is submerged in the cooking vessel.

7 Claims, 4 Drawing Sheets

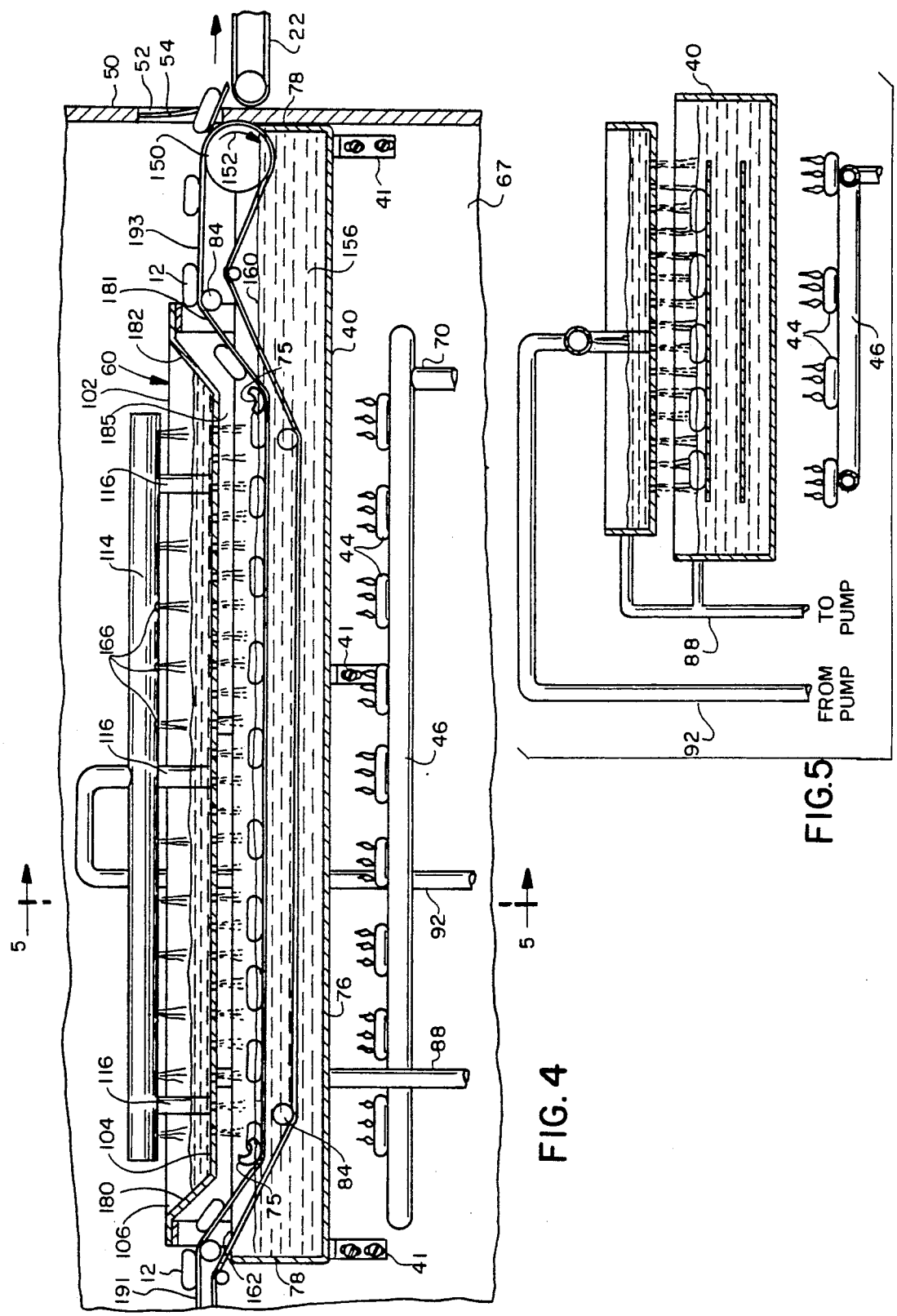

\# METHOD FOR COOKING DOUGH PRODUCTS

BACKGROUND OF THE INVENTION

1. Field of the Invention

The present invention pertains to the cooking of dough products such as bagels, using a heated water cooking medium.

2. Description of the Related Art

Various apparatus has been proposed for the mass production of dough products such as pretzels and bagels. U.S. Pat. No. 4,759,939 issued to Keller, et al., Jul. 26, 1988, discloses a continuous production of pretzels wherein a brining station is provided to spray a heated caustic solution of sodium hydroxide onto an extruded dough product. An essential feature of the treatment is the maintenance of conditions in the extruder which guarantee that the dough is not cooked. The caustic solution is sprayed on the uncooked dough prior to passing the extruded dough through a salting station where salt granules are applied to the dough with a vibrating pan. Although the caustic solution is applied at elevated temperatures, from about 180° F. to 200° F., no substantial heating or cooking of the dough is reported. However, it is believed that pretzel dough has been cooked somewhat with heated water as a preliminary step by applying a spray of a caustic soda solution to the pretzel dough. The purpose of the pretreatment waterfall step is to cause flavor and color changes in the pretzels, and any cooking thereof is believed to be incidental.

It is also known to precook dough products with an open kettle filled with heated water. The open kettle cookers require the dough products to be flipped over to complete cooking of their upper portions. It has been found that such open cooking operations are space-efficient. With submerged cookers, the dough products are susceptible to marking when carried by a conveyor, as during transit through the cooker. The dough bodies may be sized and formed using apparatus such as that disclosed in U.S. Pat. No. 4,147,809 in which the product is extruded using a screw conveyor system.

Heated water is used in other applications for processing different types of food products. For example, it is known to blanch vegetables by passing the vegetables through an insulated steam chamber which may include a waterfall shower for treating the upper surface of the products. The same blanching apparatus is also used to cool the vegetable products with water of reduced temperature. Waterfall chillers are also known to cool heated products packed in pouches, prior to freezing, as an energy saving step.

It is known to cook bagels in a water bath. For example, U.S. Pat. No. 4,657,769 teaches cooking of bagels in boiling water after leaving a wet proofer which exposes the bagels to hot, moist conditions. After cooking in boiling water for 25 to 30 seconds, the bagels are quick frozen in a −15° F. freezer. The bagels are maintained at the freezer temperatures during packaging and storage. In end use, the bagels are allowed to thaw at room temperature, optional toppings are applied and baking of the bagels is carried out in an appropriate oven.

Further advances are still being sought in the automated, mass production preparation of dough products such a bagels.

SUMMARY OF THE INVENTION

It is an object according to the present invention to provide an improved apparatus and method for cooking bagels and other dough products.

A further object according to the present invention is to provide dough cooking apparatus and methods which are space-efficient, and suitable for installation in an existing production line to increase production throughput.

A further object according to the present invention is to provide apparatus and method for cooking dough products which is rapid, and energy-efficient and which does not predispose the dough products to marring when transported on a conveyor, during the cooking step.

These and other objects according to the present invention are attained in an apparatus for cooking dough products, comprising:

a vessel for containing a heated fluid cooking medium;

means for connecting said vessel to a source of heated fluid cooking medium;

conveyor means for conveying the dough products through said vessel;

means for maintaining the level of heated fluid cooking medium in said vessel above said conveyor means so that at least the lower portions of said dough products contact the heated fluid cooking medium therein and are cooked thereby; and shower means including connecting means for connecting said shower means to a source of heated fluid cooking medium above said conveyor means for showering dough products carried on said conveyor means with heated fluid cooking medium so as to cook upper portions of the dough products.

Other objects according to the present invention are attained in a method of cooking dough products, having a minimum cooking temperature and time, comprising the steps of:

heating a fluid cooking medium to a temperature at least as great as the minimum cooking temperature;

immersing at least the lower portion of the dough products in the heated fluid cooking medium so as to cook at least the lower portion of the dough products; and simultaneously showering at least the upper portions of the dough products with the heated fluid cooking medium so as to cook the upper portion of the dough products while the lower portion of the dough products are being cooked.

BRIEF DESCRIPTION OF THE DRAWINGS

In the drawings, wherein like elements are referenced alike;

FIG. 4 is a fragmentary cross-sectional elevational view thereof shown on an enlarged scale;

FIG. 5 is a fragmentary cross-sectional view thereof, taken along the line 5—5 of FIG. 4.

DETAILED DESCRIPTION OF THE PREFERRED EMBODIMENT

Figure 1:
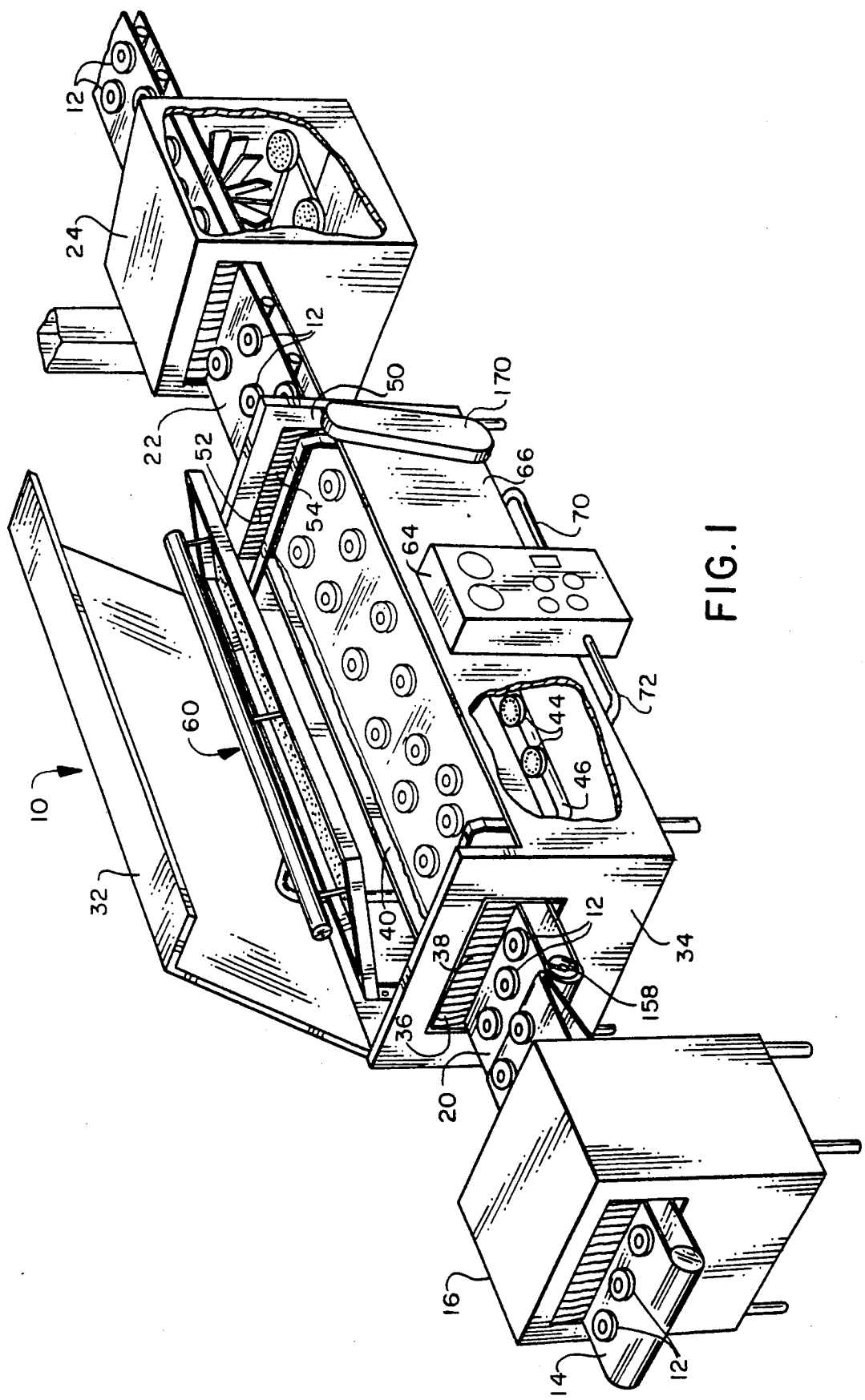
FIG. 1 is a perspective view of dough cooking apparatus illustrating aspects according to the present invention.

Referring now to the drawings, and initially to FIG. 1, a cooking apparatus is generally indicated at 10. Apparatus 10 is especially adapted for cooking dough products such as bagels 12. The bagel dough may be prepared immediately before cooking, or it may be frozen and placed in storage. After thawing of the frozen bagels, or preparation of freshly made bagels, the uncooked dough products are placed on a conveyor belt 14 for passage through a proofer 16 which prepares the dough products for cooking in apparatus 10. If desired, the proofer can include a preliminary stage for thawing of frozen dough products.

The bagels are then transferred to a conveyor 20 for passage through cooking apparatus 10. As will be seen herein, the cooking apparatus 10 provides a hot water bath for cooking the lower sides of the bagels while passing the bagels underneath a hot water shower which cooks the top half of the bagels. After cooking, the bagels are transferred to a conveyor 22 for subsequent processing and baking.

Referring additionally to FIGS. 2-7, apparatus 10 comprises a housing 30 having a cover 32 which may be hinged, if desired. Normally, cover 32 is maintained in a closed position to reduce heat loss and to maintain a saturated environment within the apparatus. An opening 36 is formed in upstream wall 34 to accommodate the passage of conveyor 20 therethrough. Curtains 38 block the opening 36 to reduce heat and vapor outflow, but are flexible so as to allow the passage of uncooked bagels 12 thereunder. Housing 30 includes an open top water tank 40 filled with water heated by burners 44 which are fed by a gas line 46.

Apparatus 10 further includes a downstream wall 50 having an opening 52 for the passage of conveyor 20 therethrough. Curtains 54 block the opening 52 to retain heat and steam vapor within apparatus 10. The bagels passing through opening 52 ar discharged onto conveyor belt 22, for transport to the dryer 24. The bagels travelling between entrance and exit openings 36, 52 pass underneath a shower apparatus generally indicated at 60 which provides cooking for those portions of the bagels not in contact with the heated water.

Figure 2:
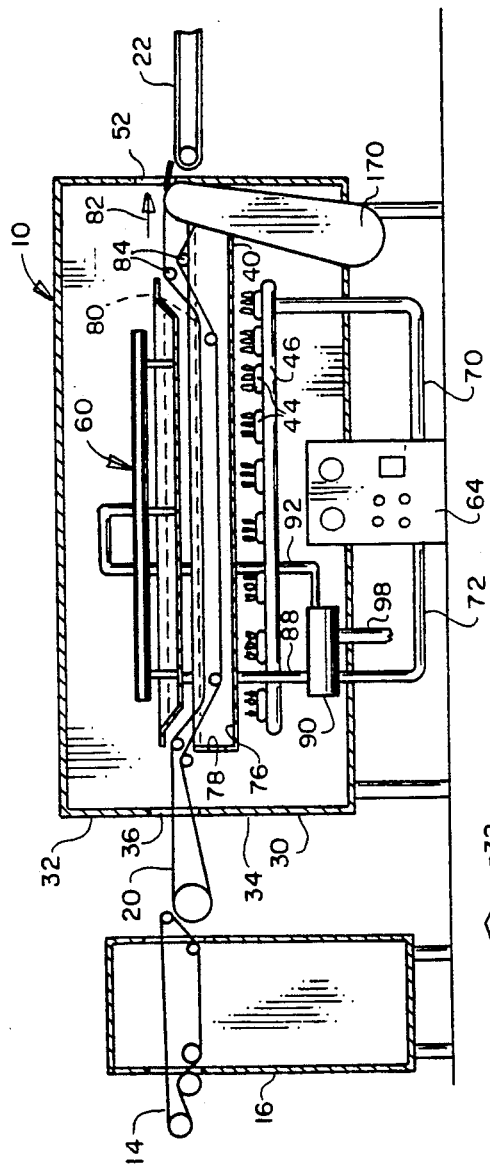
FIG. 2 is a front elevational view thereof shown partly in cross-section.
Figure 3:
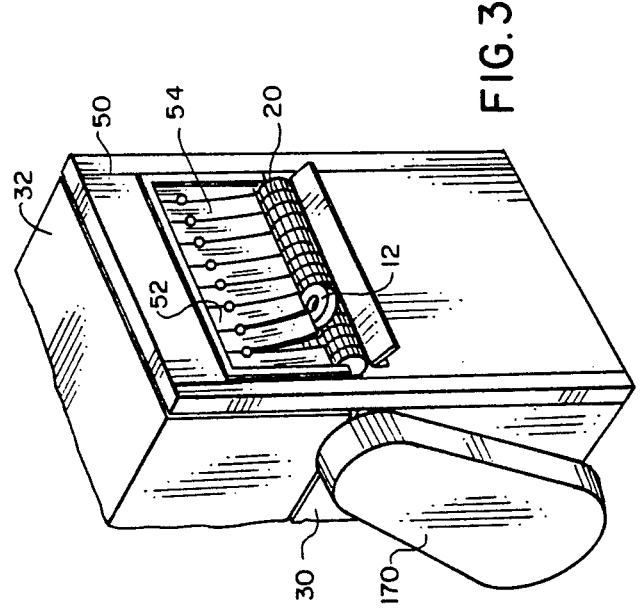
FIG. 3 is a fragmentary perspective view at the downstream end thereof.

Referring to FIGS. 1 and 2, a control unit 64 is mounted adjacent the front wall 66 of apparatus housing 30. Control unit 64 contains a variety of conventional controls which regulate various aspects of the cooking operation, such as the cooking time and temperature of the bagels or other dough products passing through apparatus 10. For example, conduits 70, 72 contain conductors transmitting temperature information from various parts of apparatus 10 to control equipment located within housing 64. Other types of data such as conveyor belt speed and water levels are also fed to the control housing.

The upstream and downstream walls 34, 50 and the front wall 66 comprise an open top structure within which the shower apparatus 60, water tank 40 and associated heating, water conduits and pumping systems are located. Referring to FIG. 2, for example, the water tank 40 has a bottom wall 76 and sidewalls 78. The lower portion of conveyor 20 passing through apparatus 10, that portion comprising the return is spaced above the bottom wall 76 of water tank 70, being completely immersed in the heated water therein. The reference numeral 80 indicates the water level within tank 40, and it can be seen that the upper portion of conveyor 20, that portion carrying the bagels, is located below the water surface being completely immersed in the water. The conveyor 20 sags at its central portion, and the depression thereof is also controlled by a series of support rollers 84 and guide shoes 75 (see FIG. 4), to insure submersion of major portions of the conveyor in tank 40. The conveyor 20 is preferably of an open or porous construction to allow the free passage of water therethrough as the conveyor is moving in the direction of arrow 82.

The water in tank 40 is heated by a series of burners 44 fed by a gas line or manifold 46. A regulator (not shown) controls the flow of gas in line 46, and is controlled by signal wires in conduit 70. Signals from conventional temperature sensors 134 are routed to controls in unit 64 to maintain the water in tank 40 at a specified temperature. Water from tank 40 travels along conduit 88 to a pump 90. The pump is controlled from unit 64 by signal wires in conduit 72. Water discharged from pump 90 is carried by conduit 92 to sprayer apparatus 60.

Pump 90 can include a feed-through or in-line heater to selectively heat the water fed to shower apparatus 60 to a higher temperature which, as will be seen, can be used to alter the cooking conditions for bagels and other dough products carried on conveyor 20.

Figure 6:
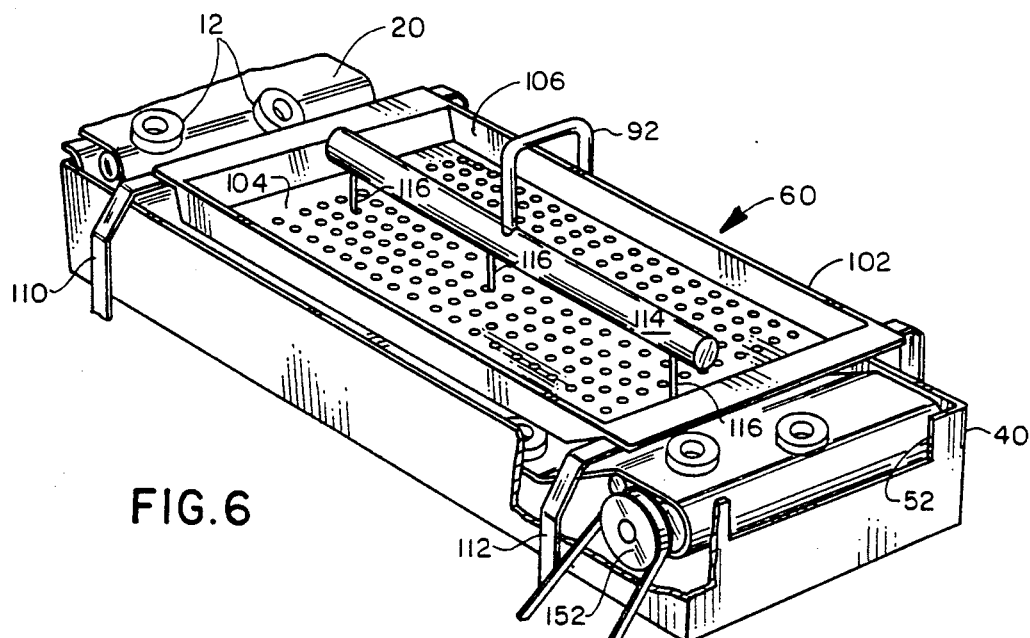
FIG. 6 is a fragmentary perspective view thereof.

Turning now to FIG. 6, shower apparatus 60 includes a shower pan 102 having a perforate bottom wall 104 and sidewalls 106. The shower pan 102 is supported by brackets 110, 112 attached to the walls of housing 30. The supply pipe 92 feeds a distribution manifold 114 which extends the length of the shower pan. Manifold 114 is supported by a series of standoff supports 116. The distribution manifold is thereby spaced above the perforated bottom wall 104 of the shower pan and extends generally the full length of the shower pan. In this manner, a water level such as that illustrated in FIG. 7 is maintained throughout the entire area of the shower pan and covers the substantial entirety of the perforate bottom wall.

Figure 7:
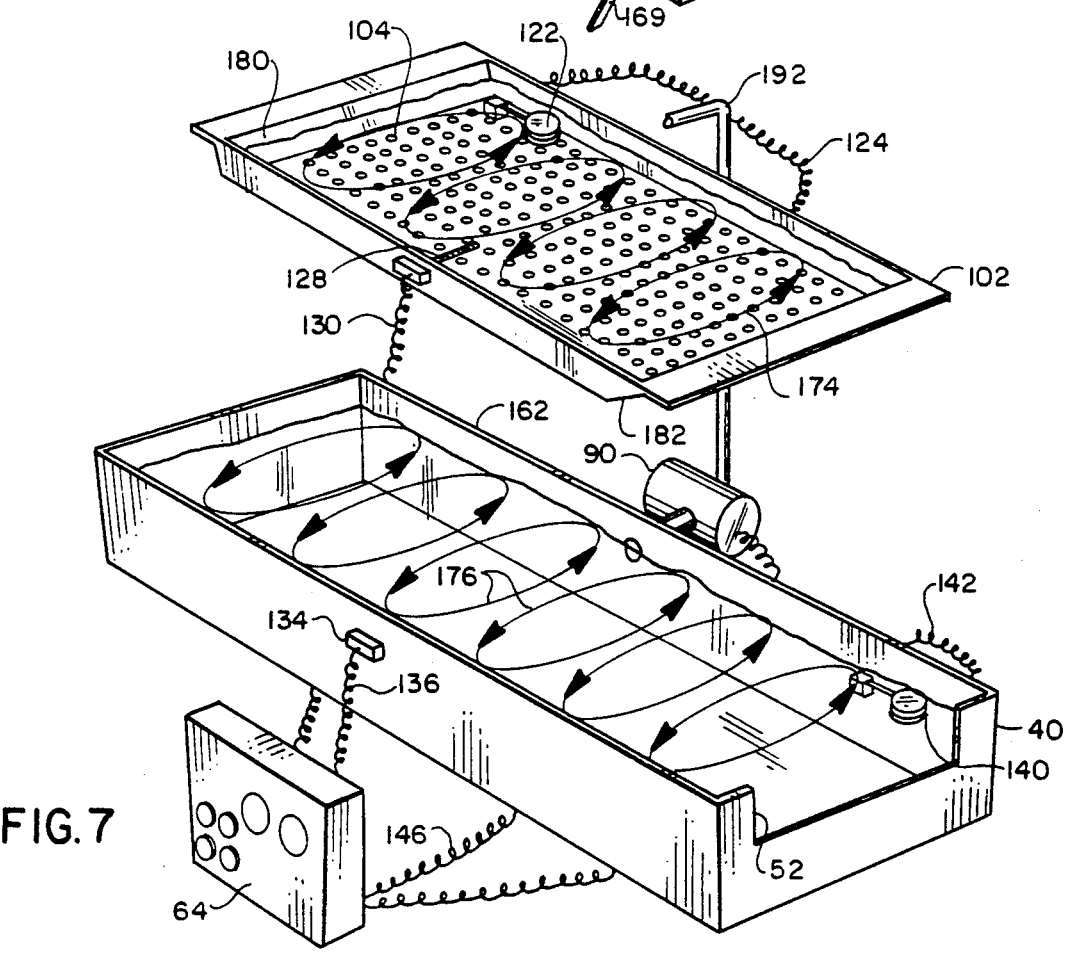
FIG. 7 is a fragmentary exploded view thereof.

Referring to FIG. 7, a float sensor 122 detects the level of water in shower pan 102 and transmits a signal indicative thereof through conductors 124 to control unit 64. A thermocouple 128 senses the temperature of water in shower pan 102 and transmits an output signal to control unit 64 through conductors 130. The temperature signal from thermocouple 128 can be used to regulate the temperature of the water applied to the top of the bagel, and if desired, the top portion of the bagel can be cooked at a different rate or at a different temperature from the bottom portion which is immersed in water tank 40.

Referring to the lower portion of FIG. 7, a thermocouple 134 senses the temperature of water in tank 40 and transmits a temperature signal through conductors 136 to control unit 64. A float sensor 140 transmits a signal indicative of the water level in tank 40 through conductors 142 to control unit 64. Conductors 146, also shown in FIG. 7, provide a path for control signals from unit 64 to pump 90. The several conductors illustrated in FIG. 7 are preferably routed through conduits 70, 72, not shown in the figure for clarity of illustration.

Operation and additional features of the cooking apparatus will now be described. If desired, the bagels 12 may be stored in a frozen condition, having been prepared at a remote location. If the bagels are frozen, it is important that the bagels be thawed and proofed before entering the cooking apparatus 10. Accordingly, the proofer apparatus 16 may be provided with a thawing stage at its upstream portion, to ready the bagels for a subsequent proofing. The bagels are transported through proofer apparatus 16 by conveyor 14, and are transferred to conveyor 20, passing through entrance opening 36 to enter housing 30.

With particular reference to FIGS. 2 and 4, conveyor 20 is driven by a drive roller 150, located adjacent exit opening 52. Drive roller 150 rotates in the direction indicated by arrow 152, and bagels carried on the upper portion of conveyor 20 are transported through apparatus 10, from entrance opening 36 to the exit opening 52. Drive roller 152 is in turn driven by a belt 169 located in housing 170, driven by a motor (not shown) located adjacent the bottom of housing 30. The motor is preferably connected to control unit 64 for regulation of the conveyor belt speed, and hence, the residence time of the bagels in the shower cooking apparatus.

Conveyor 20 undergoes a descent, upon entrance into apparatus 10. According to one aspect of the present invention, the lower portion of conveyor 20 is immersed in the heated water 156 within tank 40, reaching a relatively stable temperature by the time the conveyor belt travels over the upstream roller 158, visible in FIG. 1.

The upper portion of conveyor 20, that portion moving past roller 158 receives the bagel products as illustrated, for example, in FIG. 1. The upper portion of conveyor 20 then descends beneath a shower pan 102, being lowered below the upper end 162 of pan 40. According to an important feature of the present invention, the portion of conveyor 20 carrying the bagel products is immersed in the heated water 156, passing below the water surface 160, and the water level in tank 40 is maintained a predetermined distance above the bagel-contacting surface of conveyor 20.

As will be appreciated by those skilled in the art, bagels, like many other dough products, have a significant gas content after proofing, and are susceptible to floating when placed in a water bath. Preferably, only a portion of the bagel thickness is immersed in heated water 156, the amount being determined by the water level or water surface 160, relative to the upper bagel-contacting surface of conveyor 20. According to the present invention, between 30% and 60% of the bagel thickness, and preferably approximately 40% of the bagel thickness is immersed in the heated water 156. This insures adequate cooking of the lower portion of the bagel, while avoiding floatation of the bagels, causing the bagels to lift from the conveyor surface so as to lose traction, or, if not totally separating from the conveyor 20, reducing contact therewith so as to permit a dislocation or re-orientation of the bagel on the conveyor surface.

With the present invention, the orientation of the bagels carried on conveyor 20 is maintained throughout their travel through proofer 16 and apparatus 10. This has been found advantageous in certain types of automated bagel processing, where it is important to maintain the leading end of the bagel in a desired orientation throughout the cooking process. Perhaps even more importantly, the present invention assures contact between the bagel and the conveyor so as to maintain a desired spacing between bagels as they are processed in the cooking apparatus. If control over the spacing is lost, the bagels may contact one another, producing a surface marking which may detract from the appearance and commercial value of the cooked product. Quite importantly, the present invention achieves these important advantages without trapping the bagel products between a pair of nested conveyors, as is typical of submersible cooking operations known today. Accordingly, the surface marking and scrap generated with the conventional, submersible conveyors are avoided. As will be discussed herein, it may not even be necessary to use a flighted conveyor to maintain spacing between bagels.

As mentioned, the present invention uses shower cooking, which simultaneously cooks the upper portions of the bagels as their lower portion is cooked by partial immersion in the heated water 156. A supply pipe 92 provides a source of heated liquid to the distribution manifold 114, and heated water discharged through openings 166 in the manifold allows water to stream into shower pan 102. The bottom wall of the shower pan is perforated and, with a given head of water established in the pan, a predictable metering rate of heated water discharged from the pan is established. It has been found, for the purpose of providing a shower cooking, that a minimum head, or depth of water in the shower pan is important to maintain a desired water flow through the cooker.

The shower pan illustrated in the figures is of a relatively simple construction, and does not include internal baffles or inclined surfaces, for example, although these could be employed in the present invention. The water tank 40 is mounted to rear wall 67 of housing 30 by brackets 41, as illustrated in FIG. 4. The brackets have a series of mounting holes to provide vertical adjustment of the water tank. The water tank is thus adjustable with respect to the housing. The float sensor 140 maintains a desired water level in tank 40, and thus by raising and lowering the tank 40, the immersion depth of the conveyor, and hence the food product can be controlled. Other arrangements for adjusting the immersion depth can also be used.

As indicated in FIGS. 4 and 5, for example, a steady shower of hot water is discharged onto bagels as they pass through the cooking apparatus. The upper surface portions of the bagels, not immersed in the water in tank 40 are contacted with the shower discharge from pan 102. As would be expected, the shower water experiences a temperature drop as it falls through the atmosphere between the shower pan and the water surface of tank 40, where the exposed portions of the bagels are located. However, the shower cooker is completely enclosed by housing 30 and cover 32, and the entrance and discharge openings 36, 52 are covered with flexible curtains 38, 54, respectively, and the conveyor also helps block air intrusion into the shower area. Accordingly, the heat loss from cooking apparatus 10 is greatly dimensioned, with steam and water vapor in the ambient area between the shower pan and the tank water surface being maintained. This is important in establishing steady, relatively constant temperature conditions within cooking apparatus 10, and accordingly parameters directly affecting the amount of cooking of the bagel product can be carefully controlled.

As mentioned, some temperature loss is expected in the shower water as it falls from pan 102. Also, the shower of heated water in contact with the upper portions of the bagel is less dense than the water bath in contact with the lower bagel portion. Accordingly, it is desired in some applications that the temperature of the water in pan 102 be maintained higher than the temperature of water in tank 40. It is possible to include auxiliary heating apparatus in pan 102 to provide a relatively higher temperature for the shower water, as opposed to the bath water. Alternately, it is possible to provide an auxiliary heater in pump 90 or in the piping between the pump and the distribution manifold 114. However, neither type of auxiliary heating has been found necessary in commercial applications of the cooking apparatus.

Those skilled in the art will readily appreciate that, if an elevated shower temperature is desired, compared to the temperature of the water in tank 40, that a variety of conventional means can be used to provide the temperature difference. For example, the water feed for the shower can be drawn off close to the gas burners, before blending with cooler water in the tank.

Referring now to FIG. 7, arrows 174 indicate the circulation of heated water in shower pan 102 which provides a mixing and a resultant uniform temperature of the heated water discharged from the shower pan. Mixing of the heated water in shower pa 102 could be provided with pump apparatus, but is preferably attained through the geometry of the shower pan and the design of the manifold 114 which sets up eddy currents in the shower pan as indicated in FIG. 7. Similarly, currents are set up in tank 40, as indicated by arrows 176. It has not been found necessary to provide special equipment such as pumps for establishing the currents in tank 40. The mixing or blending of water in the shower pan 102 and in the tank 40 insure that uniform temperatures are maintained throughout operation of the cooking apparatus. These and other features of apparatus 10 offer particular advantages in a commercial environment, and accurate cooking of the bagels is readily achieved throughout a production run, even with relatively short cooking times, on the order of 20 to 60 seconds.

For the purpose of clarity of illustration, only a few bagels are shown extending adjacent one another, across the width of conveyor belt 20. However, in commercial applications, the bagels are more closely spaced on conveyor 20, and extend generally the entire width of the conveyor 20. Accordingly, it is important that "cold spots" in corners of shower pan 102, for example, be eliminated since bagels passing under that corner of the shower pan would not receive the same amount of cooking as other bagels, and thus the output from cooking apparatus 10 would not be uniform. With respect to uniform cooking, it is also important that the bagel be cooked throughout its entire volume, and that substantially the entire outer surface area of the bagel be in contact with heated water to provide a uniform cooking which leads to a uniform and pleasing texture throughout the bagel interior, when cooking and subsequent baking steps are completed.

It is important that portions of the bagel surface immediately above the water level in tank 40 receive cooking which is uniform over the top surface of the bagel and which can be controlled in a prescribed relationship with respect to the water bath. The shower apparatus according to the present invention has been found to provide such uniform cooking throughout the entire surface of the bagel extending above the water level in tank 40. Further, the substantially complete enclosure surrounding the shower apparatus and conveyor 20 is believed to play an important role in the uniformity of cooking throughout a bagel surface, and also in providing uniformity of cooking among the many bagels processed during a production run. With regard to a uniform cooking environment within apparatus 10, it is important to note that the shower apparatus 60 is spaced relatively close to the water level 160 in tank 40 and that the shower apparatus has downwardly tapered entrance and exit portions 180, 182 which effectively act as baffles blocking any disturbance in the cooking atmosphere caused by air currents which might pass through the flexible curtains 38, 54 and which might otherwise disturb the water shower pattern and the saturated environment such as the steam and heated water droplets filling the space between the bottom 104 of shower pan 102 and the water level 160 in tank 40. Accordingly, the conveyor 20 passing through the upstream opening 36 of the housing 30 must descend to clear the upstream and downstream walls 180, 181 and the bottom wall 104 of shower pan 102. As can be seen in FIG. 4, the shower pan bottom wall is disposed below the entry and exit portions 191, 193 of conveyor 20 located upstream and downstream of the shower pan.

The conveyor belt 20 is initially located at a height approximately equal to that of the shower pan and, upon entering apparatus 10, quickly descends below the water level 160 in tank 40. Accordingly, the conveyor 20 cooperates with the shower pan 102 to block intruding air currents which would otherwise be channeled through the passageway 185, formed between the bottom wall 104 of the shower pan and the water level 160 in tank 40. The same baffling effect is also present at the exit end of apparatus 10, the shower pan and conveyors having a similar, almost mirror image configuration as compared to the upstream portion described herein.

Also, with regard to uniformity of cooking, it is important that the conveyor 20 not disturb the temperature stabilization and/or saturated conditions within apparatus 10. The conveyor 20 is relatively massive and if allowed to cool below the temperature of the heated water in tank 40, could cause local temperature reductions and/or condensation in the upper strata of the water through which the bagels travel. As will be appreciated from studying FIG. 4, for example, the conveyor belt 20 has a very substantial portion thereof immersed in the heated water in tank 40. For example, the conveyor belt is immersed in the heated water shortly after it leaves the drive roller 152 and travels close to the bottom of tank 40, further aiding in mixing the heated water in tank 40 and undergoing a temperature stabilization by the time it exits the heated water, adjacent the inlet portion of apparatus 10.

The flexible curtains at the upstream end of housing 30, and the close fit of the conveyor within opening 36 maintain the heated uniform temperature of the conveyor 20. Since only a relatively minor portion of the conveyor extends outside of housing 30 the cooling effects experienced by the conveyor are very small and hence, when the conveyor loaded with bagel products descends below water level 160 in tank 40, the strata of water between the conveyor and the water surface is not chilled, and cooking of the bagels is immediately begun, further attributing to the rapid cooking time and reduced size of the cooking apparatus.

As mentioned above, it has been found important in many commercial applications to maintain a specific orientation for the products being cooked, as they travel through the cooking apparatus. For example, the leading/trailing edges of the bagels are preserved, as is the orientation of the top and bottom bagel surfaces.

Several different tests were conducted during development of the present invention. In one test, frozen bagels were thawed and the temperature thereof allowed to stabilize. The surface temperature and core temperature of the bagels entering the cooker were both 69° Fahrenheit. After proofing, product core temperatures ranged from 78° F. to 85° F. prior to entering the cooker.

During all trials, attempts were made to maintain both the temperature of the shower water and water bath within the range of 205° F.–210° F. In some instances, temperatures were below the preferred range, and in general, the shower water experienced approximately a 7° cooling as it fell through the air space between the shower pan and the water bath surface.

Conveyor speeds were selected so that cook times ranged between 30 seconds and 75 seconds, with cooking accomplished by contact with heated water, either the heated water of the shower apparatus or the heated water bath, or both. During the various tests, core temperatures of product exiting the cooker ranged between 90° and 130° F.

Upon examination, the bagels were found to be fully cooked and of a uniform quality throughout their interior volume. Quite importantly, no surface marking was found on the bagels and no scrap taken from the bagels being cooked was found in the heated water. The surface characteristics of the bagels, their color, reflectivity and lightness upon baking were all of a very good quality.

According to one aspect of the present invention, it is preferred that the conveyor speed, shower temperature and bath temperature be adjusted, so that the core temperature of a cooked bagel is raised to between 10° and 30° above the core temperature of the bagel at entry into the shower and bath.

The preferred conveyor used in the shower cooker apparatus, as mentioned, has an open design reducing the surface area contact with the bagel, and permitting the heated water to rise through the conveyor. As mentioned, the bagel dough, especially when proofed, has a relatively low density, and accordingly, the bagels are prone to floating when placed in a water bath. Concerns were initially raised as to whether contact between the bagels and the conveyor would be maintained throughout the cooking operation and further, and that the orientation of the bagels on the conveyor would not be changed as by rotating or shifting of the bagels as the conveyor travelled through the water bath. According to one aspect of the present invention, with between 40% and 60% of the bagel thickness immersed in the cooking bath, contact with the conveyor and preservation of the bagel orientation is maintained throughout the cooking operation, as the bagels travel through the heated water in tank 40. Thus, with the present invention, an unflighted conveyor belt can be employed, without the risk of marking the bagels as when they are pushed along by the conveyor flights.

The preferred shower pan, as described above, has a flat bottom wall 104. Although less preferred, a V-shaped bottom wall could be employed, and bottom walls having a zig-zag or sawtooth configuration could also be used. The flat bottom wall is generally preferred because of better water distribution throughout the area of the shower, and because less plugging of the perforations in the pan have been experienced.

Although unflighted conveyor belts are preferred for some applications, the present invention also contemplates flighted conveyor belts, having dividers for spacing products carried on the belt and to insure that the products are carried along with the belt, to maintain synchronism during a production run. As mentioned, with the present invention, the bagel bottom surfaces (in contact with the conveyor) are not marked, and flighted conveyors are expected to give good results, without making side surfaces of the bagels.

Thus, as can be seen, control over the cooking time and temperature is provided by apparatus 10, in a compact apparatus which simultaneously cooks all portions of the bagel with heated water, without marking the bagel or generating scrap from the bagels. The flexible curtains at entrance and exit openings of the housing, and the depressed conveyor belt and shower configuration are believed to be important features in maintaining a saturated, steam-filled environment.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following Claims.

What is claimed is:

1. A method of cooking dough products, having a minimum cooking temperature and time, comprising the steps of:

heading an aqueous cooking medium to a temperature at least as great as the minimum cooking temperature;

immersing at least the lower portion of the dough products in the heated aqueous cooking medium so as to cook at least the lower portion of the dough products; and simultaneously showering at least the upper portions of the dough products with the heated aqueous cooking medium so as to cook the upper portion of the dough products while the lower portion of the dough products are being cooked.

2. The method of claim 1 wherein the dough products are immersed in a vessel and showered with a shower located above the vessel, further comprising the steps of collecting aqueous cooking medium discharged from said shower in said vessel.

3. The method of claim 2 further comprising the step of circulating aqueous cooking medium between said vessel and said shower.

4. The method of claim 3 further comprising the step of heating the aqueous cooking medium in said vessel before conducting the aqueous cooking medium to said shower.

5. The method of claim 4 further comprising the step of conveying dough products through said heated cooking medium so as to maintain the lower portions thereof immersed in said heated cooking medium.

6. The method of claim 1 further comprising the step of forming a passageway above the aqueous cooking medium in which the dough products are immersed and conveying the dough products with a conveyor means so as to immerse the lower portions thereof in the aqueous cooking medium while conveying upper portions of the dough products through the passageway and blocking substantial portions of at least one end of the passageway with the conveyor means and dough products conveyed therewith so as to reduce air intrusion into the passageway, to thereby stabilize the temperature in the passageway.

7. The method of claim 1 wherein the dough products have a preselected cooking temperature and are immersed and showered until the core temperature of the dough products is raised to between 10° and 50° degrees Fahrenheit above the cooking temperature of the dough products.

* * * * *

UNITED STATES PATENT AND TRADEMARK OFFICE
CERTIFICATE OF CORRECTION

PATENT NO. : 5,131,835
DATED : July 21, 1992
INVENTOR(S) : Matthew J. Rini, et al.

It is certified that error appears in the above-identified patent and that said Letters Patent is hereby corrected as shown below:

On title page, item [56], under the heading entitled "OTHER PUBLICATIONS", after "Blanching" insert --Systems.--.

In Column 7, line 20, change "pa" to read --pan--.

IN THE CLAIMS:

In Column 10, line 56, (Claim 5, line 1) change the numeral "4" to read --1--.

Signed and Sealed this

Sixteenth Day of November, 1993

Attest:

BRUCE LEHMAN

Attesting Officer

Commissioner of Patents and Trademarks